(12) United States Patent
Oriet (10) Patent No.: US 8,631,885 B2
(45) Date of Patent: Jan. 21, 2014

(54) MULTI-USE DUAL-ENGINE, VARIABLE-POWER DRIVE

(76) Inventor: Leo Oriet, Rochester Hills, MI (US)

( * ) Notice: Subject to any disclaimer, the term of this patent is extended or adjusted under 35 U.S.C. 154(b) by 438 days.

(21) Appl. No.: 12/928,770

(22) Filed: Dec. 17, 2010

(65) Prior Publication Data

US 2012/0152631 A1 Jun. 21, 2012

(51) Int. Cl.
B60K 1/02 (2006.01)

(52) U.S. Cl.
USPC ..................... 180/65.22; 180/69.6

(58) Field of Classification Search
USPC ........ 180/54.1, 65.21, 65.22, 65.225, 65.245, 180/65.26, 65.265, 65.28, 65.285, 69.6, 180/297; 477/2, 3, 5, 7; 320/107
See application file for complete search history.

(56) References Cited

U.S. PATENT DOCUMENTS

| | | | | |
|---|---|---|---|---|
| 2,000,709 | A * | 5/1935 | Matthews | 180/69.6 |
| 2,142,102 | A * | 1/1939 | Bailey et al. | 123/349 |
| 2,155,434 | A * | 4/1939 | Marsh | 74/661 |
| 2,238,615 | A * | 4/1941 | Wolf | 180/69.6 |
| 2,261,670 | A * | 11/1941 | Bailey | 60/710 |
| RE22,236 | E * | 12/1942 | Wolf | 180/69.6 |
| 2,354,734 | A * | 8/1944 | Barkley | 180/56 |
| 2,395,769 | A * | 2/1946 | Thornton | 180/294 |
| 2,723,531 | A * | 11/1955 | Wosika et al. | 60/718 |
| 2,947,497 | A * | 8/1960 | Sznycer | 244/17.11 |
| 3,645,351 | A * | 2/1972 | Muller | 180/69.6 |
| 4,392,393 | A * | 7/1983 | Montgomery | 74/661 |
| 5,419,112 | A * | 5/1995 | Farrell | 60/39.15 |
| 5,586,613 | A * | 12/1996 | Ehsani | 180/65.23 |
| 6,306,056 | B1 * | 10/2001 | Moore | 475/5 |
| 6,830,532 | B1 * | 12/2004 | Gebby et al. | 477/3 |
| 6,852,062 | B1 * | 2/2005 | Ahner et al. | 477/2 |
| 6,935,115 | B2 * | 8/2005 | Anderson | 60/698 |
| 7,152,705 | B2 * | 12/2006 | Alster et al. | 180/65.245 |
| 7,317,259 | B2 * | 1/2008 | Yamauchi | 290/40 C |
| 7,654,355 | B1 * | 2/2010 | Williams | 180/165 |
| 7,792,626 | B2 * | 9/2010 | Eriksson et al. | 701/102 |
| 8,323,144 | B1 * | 12/2012 | Bin et al. | 477/2 |
| 8,337,359 | B2 * | 12/2012 | Hofbauer | 477/5 |
| 2005/0023058 | A1 * | 2/2005 | Gebby et al. | 180/69.6 |
| 2006/0107920 | A1 * | 5/2006 | Serkh et al. | 123/198 R |
| 2007/0012493 | A1 * | 1/2007 | Jones | 180/65.3 |
| 2008/0015760 | A1 * | 1/2008 | Yamauchi | 701/67 |
| 2008/0185198 | A1 * | 8/2008 | Jones | 180/65.2 |
| 2009/0256343 | A1 * | 10/2009 | Oriet et al. | 280/781 |
| 2009/0321158 | A1 * | 12/2009 | Glonner et al. | 180/65.23 |
| 2010/0056327 | A1 * | 3/2010 | Hofbauer | 477/5 |
| 2010/0148588 | A1 * | 6/2010 | Algrain | 307/84 |
| 2012/0152631 | A1 * | 6/2012 | Oriet | 180/65.22 |
| 2012/0285291 | A1 * | 11/2012 | Shi et al. | 74/665 A |

(Continued)

*Primary Examiner* — Katy M Ebner
*Assistant Examiner* — Brodie Follman
(74) *Attorney, Agent, or Firm* — George L. Boller (57) ABSTRACT

A power unit has: a conversion device (3, 106) for converting mechanical energy of rotation into a different form of energy which can be used for various purposes; a first internal combustion engine (1, 102); a second internal combustion engine (5, 104); a first clutch (2, 103) through which the first engine can be selectively coupled to a first axial end of a rotor shaft of the conversion device for transmitting mechanical energy of rotation to the rotor shaft when the first clutch is engaged; and a second clutch (4, 105) through which the second engine can be selectively coupled to a second axial end of the rotor shaft for transmitting mechanical energy of rotation from the second engine to the rotor shaft when the second clutch is coupling the second engine to the rotor shaft.

15 Claims, 8 Drawing Sheets

(56) References Cited

U.S. PATENT DOCUMENTS

2012/0299536 A1* 11/2012 Hermann et al. ............ 320/107
2013/0081889 A1* 4/2013 Jo et al. ........................ 180/69.6
2013/0086919 A1* 4/2013 Dooley et al. ................... 60/778

* cited by examiner

MULTI-USE DUAL-ENGINE, VARIABLE-POWER DRIVE

FIELD OF THE INVENTION

This invention relates to a dual-engine, variable-power drive capable of multiple uses which include propulsion of motive vehicles.

BACKGROUND OF THE INVENTION

Achieving future fuel efficiency improvements in medium and heavy duty commercial trucks and buses will be a challenging task for commercial truck and diesel engine manufacturers. Over the past several decades, fuel efficiency improvements have been realized largely through the application of computer technology to the design and development of engines and powertrains and through the adoption of sophisticated engine control systems in commercial trucks. Hybrid powertrains have contributed to fuel economy improvements, but at significantly increased manufacturing costs that raise prices that purchasers must pay. The inventor believes that further improvements in engine/powertrain design and development and in engine control systems are unlikely to yield more than minimal fuel economy improvements.

Currently manufactured long haul commercial trucks commonly use large diesel engines in the range of 400-600 maximum horsepower as their prime movers. An engine having such a maximum power output is necessary to accommodate the peak power requirement for typical vocation drive cycles of those vehicles.

The current cost of hybrid powertrains does not justify their wide-spread adoption by the commercial trucking industry. Current sales of hybrid truck, buses, and coaches are predominantly in fulfillment of governmental contracts which use taxpayer funds as a subsidy for the additional costs of such "green" technologies in purchased vehicles.

Current large displacement fixed horsepower diesel engines operate within sub-optimal efficiencies, commonly within ranges between 800 and 2200 revolutions per minute (RPM). Because they accommodate changes in torque and power demand by varying engine RPM, such engines are inherently incapable of achieving optimum performance and best fuel economy.

Failure of a current diesel engine while a vehicle is on the road may create a hazardous condition for the driver and surrounding traffic and/or disable the vehicle to such an extent that unexpected delay, economic losses, and/or customer dissatisfaction become inevitable results of the failure.

Virtually all commercial trucks, buses and coaches on the roads today use conventional brake pads exclusively to decelerate the vehicle, converting the kinetic energy into wasteful heat. While such waste can be partially mitigated by a hybrid powertrain, hybrid powertrains are, as mentioned earlier, not currently cost-justifiable. A hybrid powertrain also inherently adds weight to a vehicle, a fact that adversely impacts fuel economy.

SUMMARY OF THE INVENTION

Briefly, this invention relates to a drive which when used to propel a vehicle, especially a large commercial vehicle such as a truck or bus for example, selectively uses one or both of two internal combustion engines, especially turbocharged diesel engines, depending on torque and power demands being imposed on the vehicle as it is being driven. The inventor's analysis of the invented drive shows that this selective use of the engines can enable a vehicle to achieve significant fuel economy improvements in comparison to improvement which is likely to be obtained in engines and engine controls through use of conventional engine/powertrain design and development techniques which were mentioned earlier.

The inventor's analysis shows that a single one of two V8 engines can provide sufficient power and torque for approximately 80% of a typical long haul drive cycle. During portions of a drive cycle where demand is greater, such as climbing a grade or accelerating the vehicle, a controller automatically starts a second V8 engine to provide the additional power required. Once the drive cycle returns to lesser demand, the controller automatically turns off one of the engines. In this way the invented drive is capable of maximizing efficiency through optimized variable power delivery.

Each of the two engines is more compact than a single large engine which is capable of delivering maximum power comparable to that of the invented drive when both of its engines are operating the invented drive at maximum power.

Failure of one of the two engines while the vehicle is on the road is unlikely to disable the vehicle because the other engine can be used in most driving situations to drive the vehicle directly to a service facility or to a suitable off-road location.

The invented drive can recover substantial brake energy by charging an on-board energy storage system, examples of which are electric energy storage in a battery, battery bank, or ultra-capacitor and hydraulic energy storage in an accumulator. Refuse collection and package delivery vocations present perhaps the largest market opportunity for energy recapture due to low average speeds with frequent stop and start driving. Line haul vocations offer less opportunity for brake energy recapture due to continuous, high speed, non-start-and-stop drive cycles.

An example of the invented dual-engine, variable-power drive comprises two generic V8 diesel engines having opposite flywheel rotation which can operate concurrently to deliver power through one or more drive axles to driven wheels that propel a wheeled vehicle such as a commercial truck. When both engines are running at the same power output level, engine torque reaction is cancelled through the respective engine mountings.

One general aspect of the invention relates to the subject matter set forth in independent claim 1.

Another general aspect of the invention relates to the subject matter set forth in independent claim 7.

Further aspects are set forth in the various dependent Claims.

The foregoing summary, accompanied by further detail of the disclosure, will be presented in the Detailed Description below with reference to the following drawings that are part of this disclosure.

DETAILED DESCRIPTION

Figure 1:
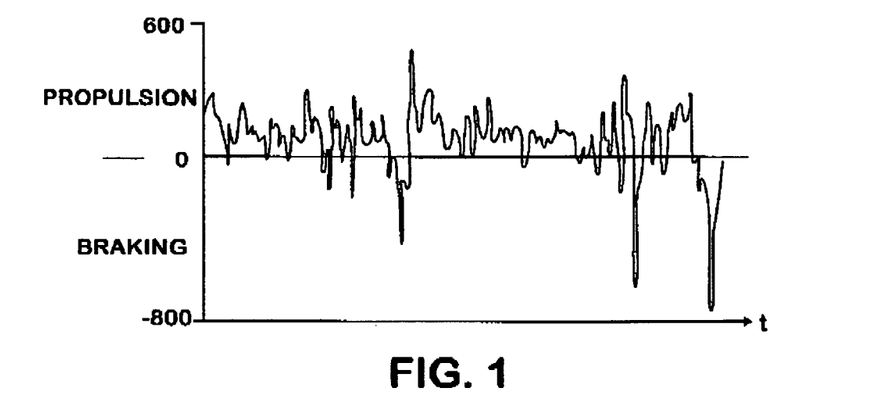
FIGS. 1 and 2 are truck drive cycle power diagrams showing power requirement as a function of drive time during each of two different specified drive cycles.

FIG. 1 is a representative truck drive cycle power diagram (HWFET) showing engine power requirement as a function of drive time during a specified drive cycle. It shows a peak power requirement near 600 horsepower (hp.). The average power requirement is much lower.

Figure 2:
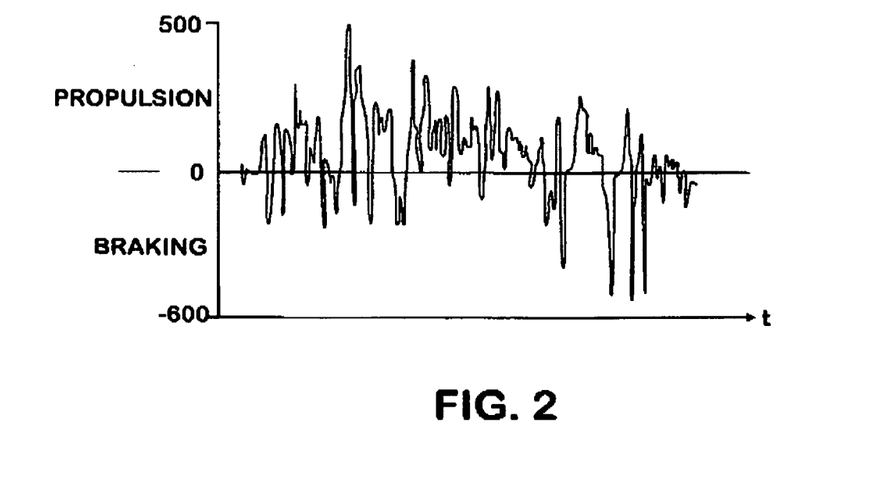

FIG. 2 is a representative truck drive cycle power diagram (WVU Interstate) showing engine power requirement as a function of drive time during a specified drive cycle. It shows a peak power requirement near 500 horsepower (hp.). The average power requirement is much lower.

Figure 3:
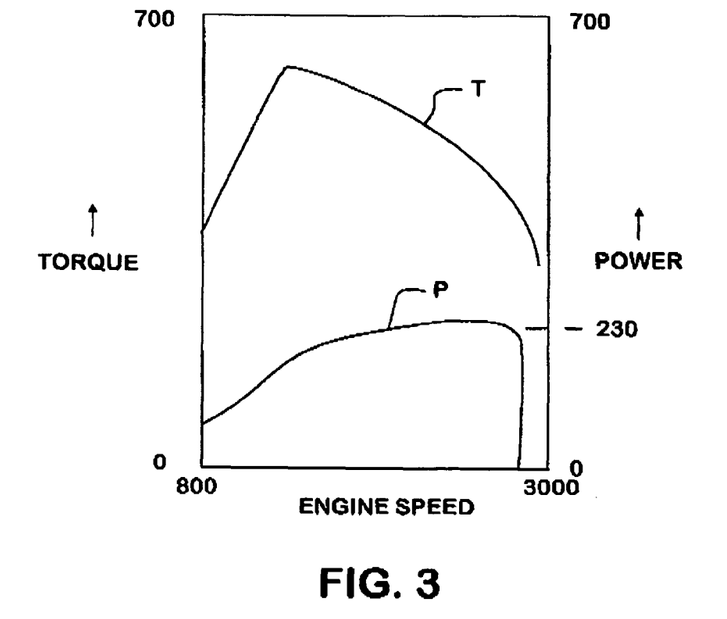
FIGS. 3 and 4 are engine torque/speed, torque/power diagrams for respective currently manufactured turbocharged diesel engines rated at about 230 hp and 475 hp respectively.
Figure 4:
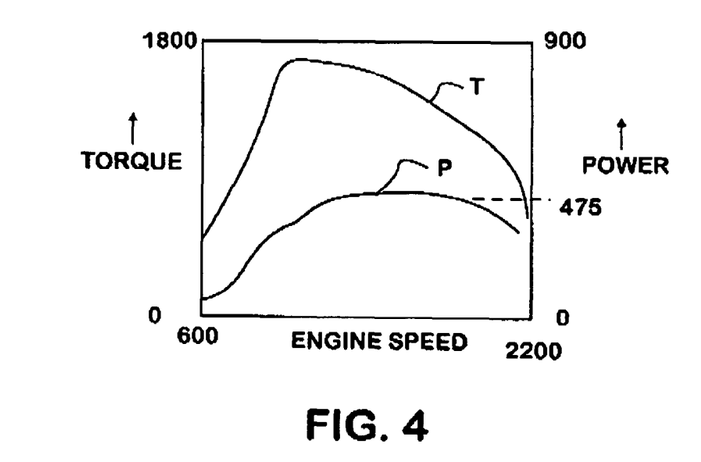

FIGS. 3 and 4 are engine torque/speed, torque/power diagrams for respective turbocharged diesel engines rated at about 230 hp and 475 hp respectively. The trace T in each diagram represents torque, and the trace P, power.

FIGS. 1-4 are presented to show how a vehicle's fuel economy can be substantially improved by a power unit embodying the invented drive dual-engine, variable-power drive described herein.

Figure 5:
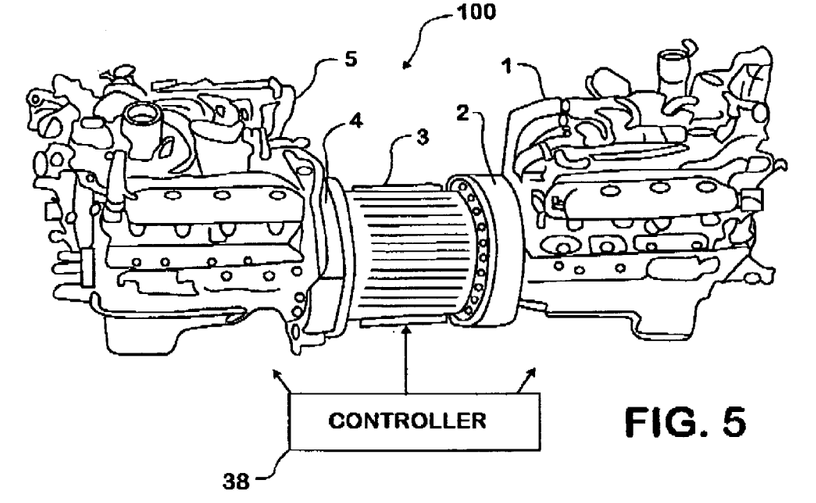
FIG. 5 is perspective view of an embodiment of the invented dual-engine, variable-power drive.
Figure 6:
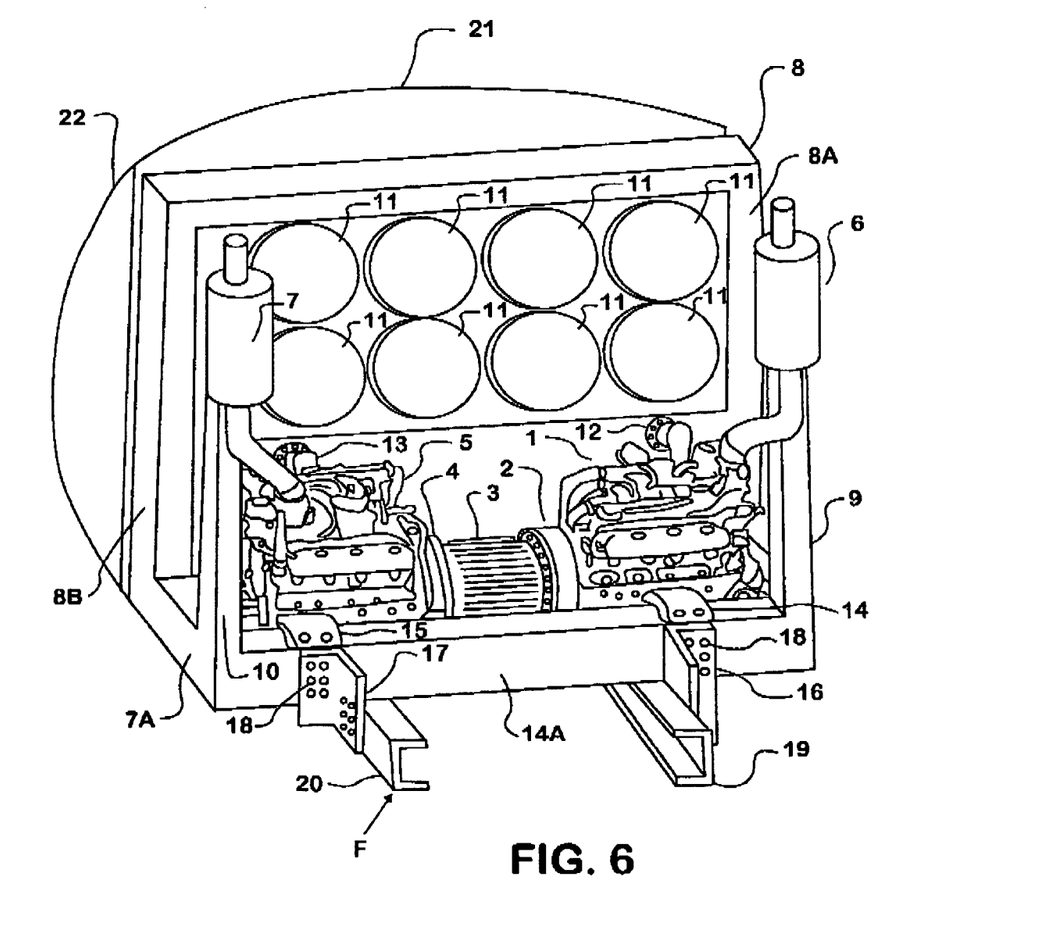
FIG. 6 is perspective view of the dual-engine, variable-power drive of FIG. 5 mounted on a chassis of a truck vehicle having a rear axle drive.
Figure 7:
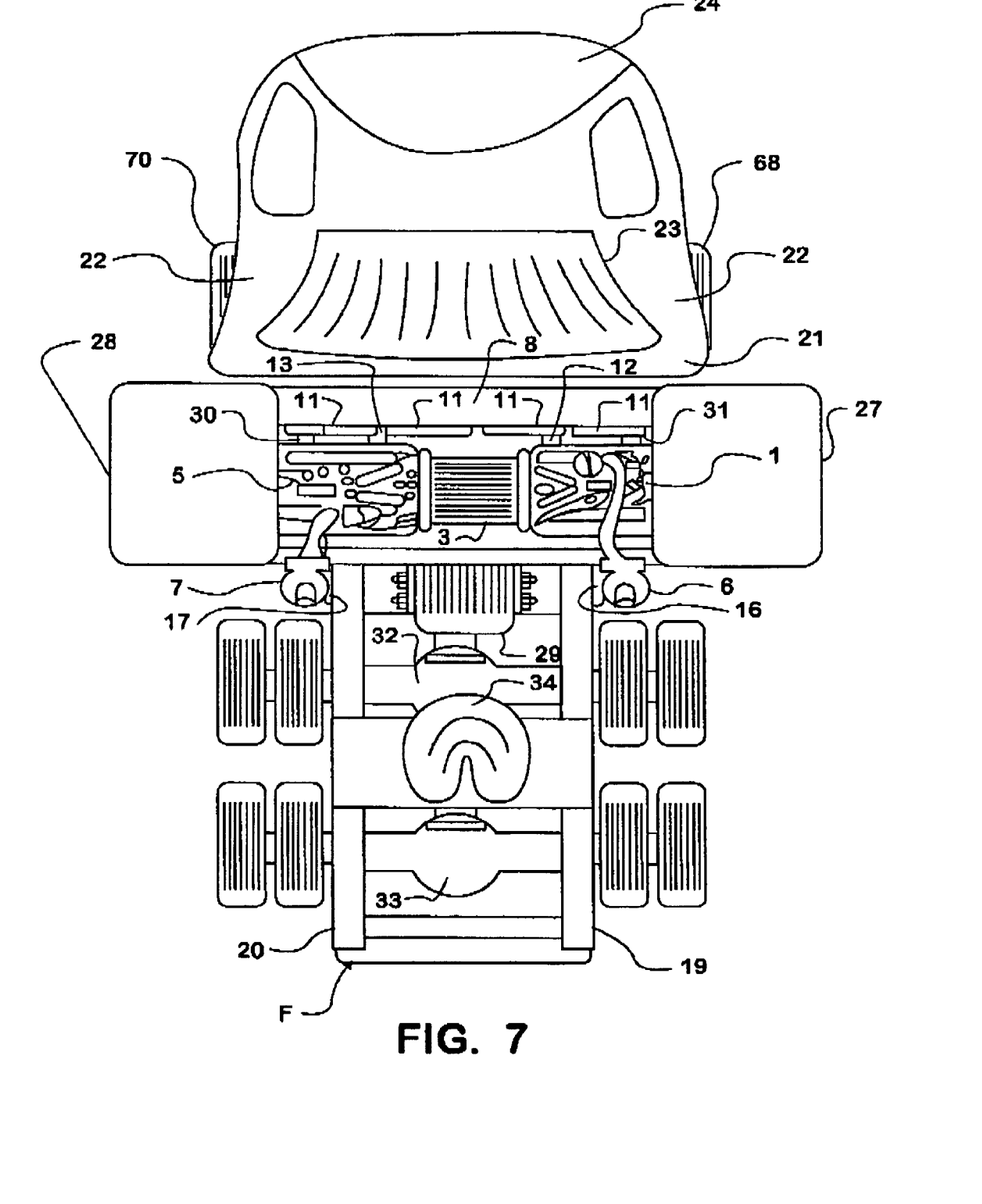
FIG. 7 is a top plan view of the truck vehicle of FIG. 6 showing the dual-engine, variable-power drive.

FIGS. 5-8 show an embodiment of the invented dual-engine, variable-power drive 100 which, when used to propel a truck vehicle and referenced to locations in a chassis frame F of such as vehicle as in FIGS. 6 and 7, comprises a starboard side turbodiesel propulsion engine 1, a starboard side hydraulic internal wet-disk clutch 2, an electric generator 3, a port side hydraulic internal wet-disk clutch 4, a port side turbodiesel propulsion engine 5, a starboard side engine exhaust stack 6, including a diesel particulate filter (DPF) and optional exhaust treatment apparatus, and a port side engine exhaust stack 7, including a diesel particulate filter (DPF) and optional exhaust treatment apparatus.

Those seven components 1 through 7 form an assembly (shown by itself in FIG. 5) which is supported on an engine and cooling module support frame 7A shown in FIG. 6.

Support frame 7A comprises a starboard side upright 8A and a port side upright 8B for supporting a cooling module 8 which comprises a radiator located forwardly along the chassis frame in relation to components 1 through 5. Support frame 7A also comprises a starboard side upright 9 for supporting starboard side exhaust stack 6 and a port side upright 10 for supporting port side exhaust stack 7. Cooling module 8 comprises multiple electric-driven fans 11 directly rearward of its radiator. When operated, fans 11 draw air through the radiator to cool liquid coolant passing through the radiator.

A starboard side supply coolant conduit 12 supplies liquid coolant to the radiator after having been circulated through coolant passageways in engine 1. A starboard side return coolant conduit which supplies liquid which has been cooled by passage through the radiator back to engine 1 is present but cannot be seen. A port side supply coolant conduit 13 supplies liquid coolant to the radiator after having been circulated through coolant passageways in engine 5. A port side return coolant conduit which supplies liquid which has been cooled by passage through the radiator back to engine 5 is present but cannot be seen.

Engine mounts 14 (only one of which is seen in FIG. 6) support engine 1 at opposite sides of its engine block (front and rear sides as referenced to chassis frame F) on horizontal members 14A (only one of which can be seen in FIG. 6) of support frame 7A. Engine mounts 15 (only one of which can be seen in FIG. 6) support engine 5 at opposite sides of its engine block on members 14A. What would be commonly understood as the front of starboard engine 1 and the front of port engine 5 face in opposite directions at the far ends of drive 100. One engine has counterclockwise (CCW) rotation as viewed from its front and the other has clockwise (CW) rotation as viewed from its front. Having opposite rotation engines enables the rotor shaft of the generator, both clutches, and the crankshafts of both engines to rotate about a common axis.

Members 14A are disposed atop chassis frame F at right angles to the length of chassis frame F and are fastened to right (starboard side) and left (port side) side rails 19 and 20 of chassis frame F by starboard side mounts 16 and port side mounts 17 respectively using fasteners 18.

The truck vehicle which is propelled by drive 100 comprises a cab C (FIGS. 7 and 8) having an interior compartment for a driver of the vehicle. A wind deflector present on the exterior of cab C comprises an upper wind deflector 21 which is smoothly contoured upwardly and rearwardly along the length of the cab when looking rearward from the front of the vehicle as in FIG. 8. Starboard side and port side wind deflectors 22 of the wind deflector join with upper wind deflector 21 and are smoothly contoured laterally outwardly and rearwardly. Upper wind deflector 21 comprises an air intake grille 23 directly in front of cooling module 8 to allow air to be drawn through the radiator of the cooling module, by ram air effect and/or use of fans 11. Cab C comprises a front windshield 24 through which the driver has a frontal view from the cab interior.

A cover comprising movable starboard and port side clamshell halves 27, 28 covers support frame 7A and the components which it supports when the clamshell is closed while exhaust stacks 6, 7 are shaped to place their tailpipes outside the cover when the cover is closed. FIG. 7 shows the clamshell halves swung open to provide service access.

The vehicle also has a rotary electric machine 29 for operating a tandem rear axle which comprises a front tandem drive axle 32 and a rear tandem drive axle 33. Rotary electric machine 29 has a shaft which is coupled to a differential mechanism of front drive axle 32, and through that differential mechanism, to a differential mechanism of rear drive axle 33.

FIG. 7 shows a port side charge air cooler line 30 running to the radiator of cooling module 8 from a charge air cooler that cools boost air created by the engine turbocharger before entering engine 5 and a starboard side charge air cooler line 31 running to the radiator from a charge air cooler that cools boost air created by the turbocharger before entering engine 1. The return lines from the radiator to the respective charge air coolers which complete the respective coolant loops cannot be seen in FIG. 7.

Figure 8:
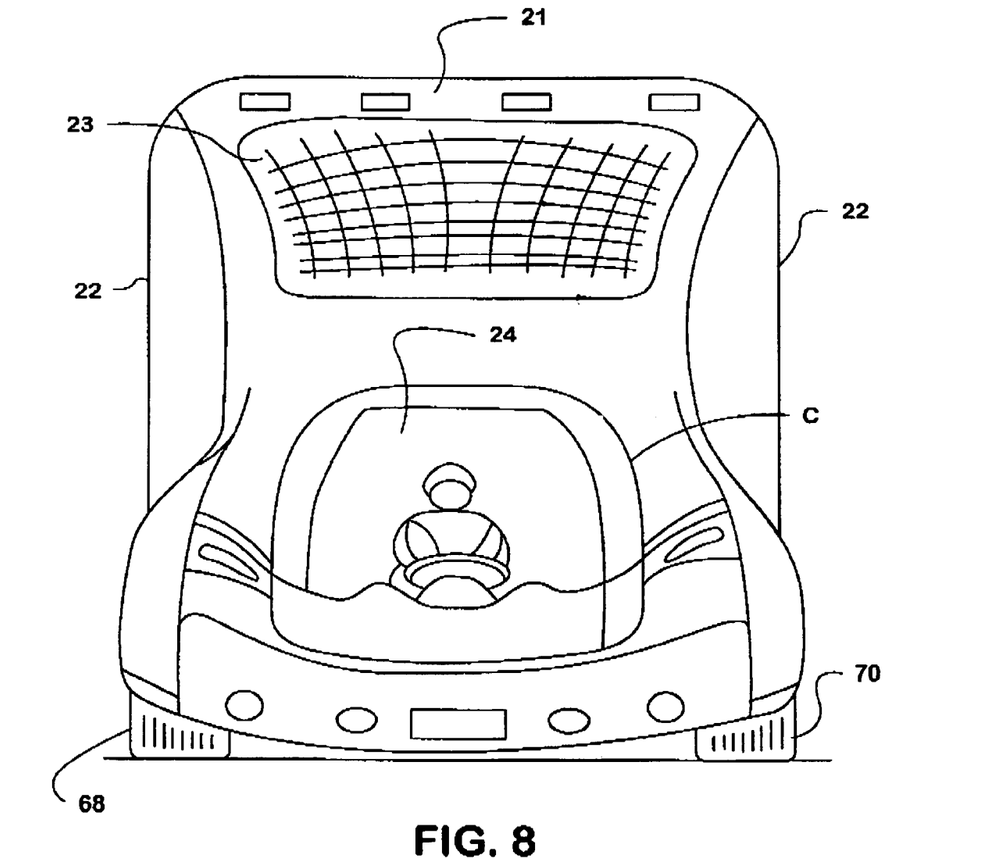
FIG. 8 is a front elevation view of the truck vehicle of FIG. 7.

Right and left front steerable wheels 68, 70 respectively are suspended from chassis frame F on right and left sides for steering the truck. Front and rear tandem drive axles 32, 33 are suspended from chassis frame F rearward of front steerable wheels 68, 70. Axle 32 has at least one driven wheel 74 on the right side and at least one driven wheel 76 on the left side, and axle 33 has at least one driven wheel 80 on the right side and at least one driven wheel 82 on the left side. All wheels comprise pneumatic tires. The truck vehicle which is illustrated is an example of a highway tractor which has a fifth wheel 34 to which a trailer can be coupled for towing by the tractor.

A controller 38 controls which one, or ones, of engines 1 and 5 is, or are, used at any given time when the vehicle is being operated. Controller 38 comprises a control strategy for coordinating control of the engines, the clutches, and the conversion device to manage powerflow to the driven wheels.

When the truck is being propelled, one or both engines are operated depending on the amount of torque being requested by the driver. The torque request is commonly provided by depression of an accelerator pedal in cab C. A sensor which tracks pedal depression provides an input to controller 38 which has a control strategy that acts on the input to control drive 100 in a manner which leads to satisfaction of the request. When operation of either engine 1, 5 is needed to respond to a torque request, controller 38 causes its corresponding clutch 2, 4 to become engaged, operatively coupling engine crankshaft rotation to a shaft of generator 3.

A flywheel is coupled for rotation with the respective engine crankshaft near a respective rear main bearing for the crankshaft. Each flywheel stores rotational energy created by the power impulses of the respective engine that occur during each combustion event in the cylinders of the respective engine, and releases stored energy between power impulses, thus assuring less fluctuation in engine speed and smoother engine operation. The size of the flywheel depends on the number of engine cylinders and the general construction of the engine. With a large number of cylinders and the consequent overlapping of power impulses, there is less need for a flywheel and consequently the flywheel can be relatively smaller.

Each flywheel is coupled through the respective clutch 2, 4 to a respective end of a rotor shaft of generator 3 whose housing is fastened to the blocks of engines 1, 5 so that the generator is thereby supported on support frame 7A through the engine blocks.

A running engine's mechanical energy of rotation becomes an input to the rotor shaft of generator 3 whenever the respective clutch 2, 4 is engaged. When a single engine, such as engine 1 for example, can provide sufficient power and torque for propelling a truck (approximately 80% of a typical long haul drive cycle) only engine 1, and not engine 5, operates. During portions of a drive cycle where demand is greater, such as climbing a grade or accelerating the vehicle, controller 38 automatically starts engine 5 and engages clutch 4 to provide the additional power required. Controller 38 coordinates control of engines 1, 5 so that both contribute mechanical energy of rotation to the rotor shaft of generator 3. Once the drive cycle returns to lesser demand, the controller automatically turns off engine 5 and disengages clutch 4.

When driven wheels 74, 76, 80, 82 are driven to propel the vehicle, they become loads on rotary electric machine 29. Electric machine 29 and those driven wheels then become the load on generator 3. When propelling the vehicle, electric machine 29 operates as an electric motor.

The mechanical energy input applied to the rotor shaft of generator 3 causes generator 3 to deliver electric current to electric machine 29, causing the latter to operate as an electric motor that provides torque to the driven wheels 74, 76, 80, 82 of the tandem axle for satisfying a torque request by the driver.

Controller 38 can also coordinate control of generator 3 and of electric machine 29 with control of engines 1, 5. By controlling electric machine 29 to regulate the load on generator 3, engine speed and that of the rotor shaft of generator 3 can be held constant while accelerating the truck, thereby providing acceleration in the same manner as an infinitely variable mechanical transmission.

By making the electric machine 29 reversible, the truck can be driven either forward or in reverse.

The truck can also provide brake energy recovery by using the driven axle wheels to operate electric machine 29 as an electric generator to charge an energy storage device or system, such as a battery, battery bank, or ultra-capacitor 39.

Figure 9:
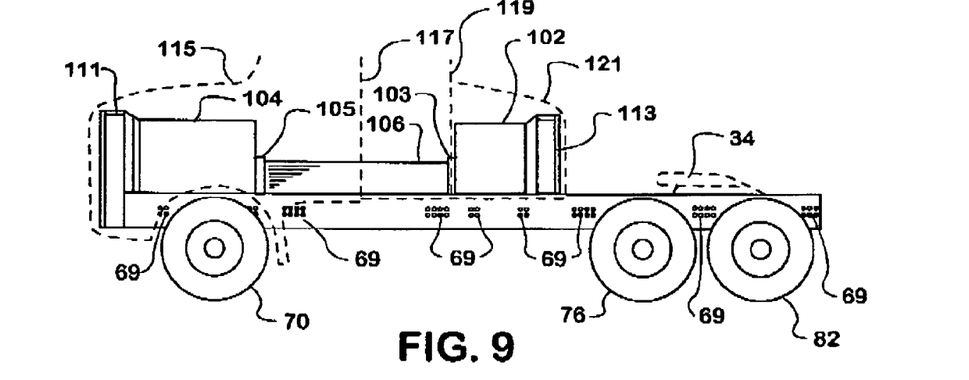
FIG. 9 is a left side elevation view of another truck chassis that embodies the invented dual-engine, variable-power drive.
Figure 10:
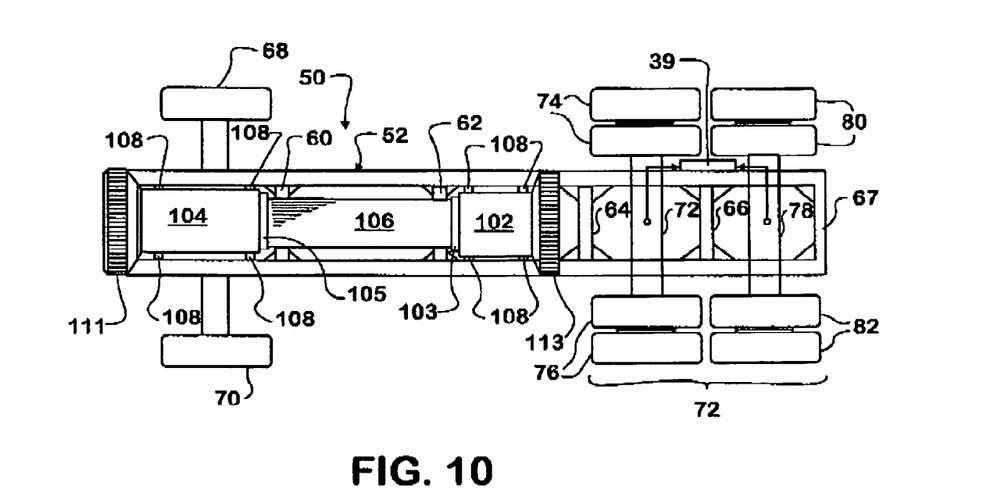
FIG. 10 is a top view of the truck chassis of FIG. 9.

FIGS. 9 and 10 illustrate a truck vehicle chassis 50 having a length extending from front to rear, a right side, and a left side. Chassis 50 comprises a frame 52 having a right side rail 54 extending from front to rear, a left side rail 56 extending from front to rear, and various cross-members 58, 60, 62, 64, 66, 67 bridging the side rails. The cross-members are securely fastened to the side rails by Huck fasteners 69.

Right and left front steerable wheels 68, 70 respectively are suspended from frame 52 on the right and left sides for steering the truck vehicle. A tandem rear axle 72 is suspended from frame 52 rearward of front steerable wheels 68, 70. Tandem rear axle 72 is illustrated by way of example to comprise two electric drive axles, one of which is a first (front tandem) drive axle 72 having at least one driven wheel 74 on the right side and at least one driven wheel 76 on the left side and the other of which is a second (rear tandem) drive axle 78 rearward of first drive axle 72 and having at least one driven wheel 80 on the right side and at least one driven wheel 82 on the left side. All wheels comprise pneumatic tires.

Each drive axle 72, 74 comprises a respective differential gear mechanism which is operated by a respective rotary electric machine housed within a respective casing within which respective right and left axle shafts extend from the respective differential gear mechanism to the respective axle's right and left driven wheels.

A dual-engine, variable-power drive 100 drives the rotary electric machine of each electric drive axle to deliver torque to wheels 74, 76, 80, 82 to propel the vehicle. Dual-engine, variable-power drive 100 comprises a rear internal combustion engine 102 and a front internal combustion engine 104 at opposite lengthwise ends. Drive 100 also comprises a rear hydraulic internal wet-disk clutch 103, a front hydraulic internal wet-disk clutch 105, and an electric generator 106. A respective flywheel is coupled for rotation with the respective engine crankshaft as explained in the description of earlier Figures.

Each flywheel is coupled through the respective clutch 103, 105 to a respective end of a rotor shaft of electric generator 106 whose housing is fastened to the blocks of engines 102, 104 so that the generator is thereby supported by the engine blocks. When a clutch is engaged, it couples flywheel rotation to the rotor shaft of generator 106, and when a clutch is disengaged, it does not couple flywheel rotation to the shaft of generator 106.

Rear engine 102 is shown by way of example as a standard production turbodiesel engine having counterclockwise (CCW) crankshaft rotation as viewed from the front end of the engine. Use of a V configuration for rear engine 102 can minimize the overall weight of drive 100.

Figure 12:
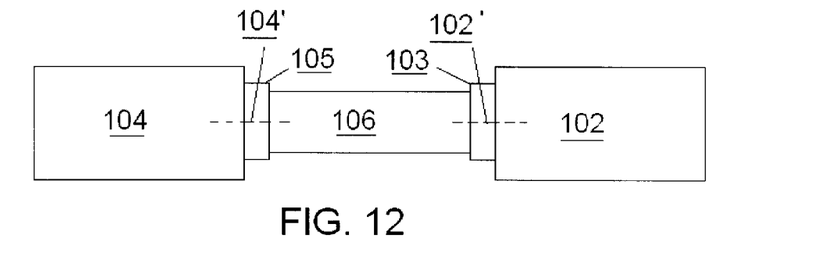
FIG. 12 is a view showing more detail of a portion of FIG. 10.
Figure 13:
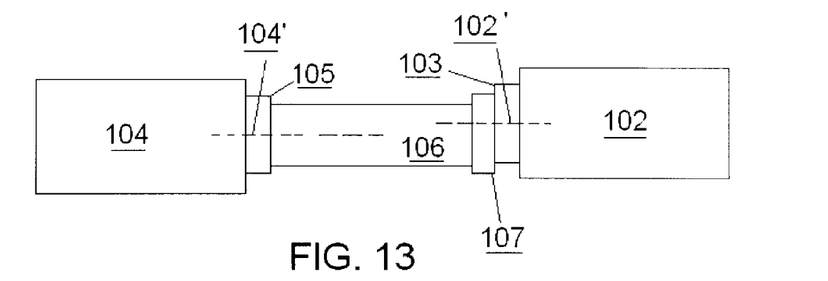
FIG. 13 is a view similar to FIG. 12 but showing an alternate embodiment.

Front engine 104 is shown by way of example to be identical to rear engine 102, except for having opposite crankshaft rotation. This allows the crankshaft axis 102' of engine 102 and the crankshaft axis 104' of engine 104 to be co-linear as shown in FIG. 12. An alternate configuration that can accommodate exactly identical engines, both of which have the same direction of rotation, would include a mechanism 107 for inverting the rotation of one engine, such as engine 102, and such a device may offset that engine's crankshaft axis 102' from that of the other engine 104 and from the rotor shaft of generator 106, as shown in FIG. 13.

In FIG. 9 the front of front engine 104 and the front of rear engine 102 face in opposite directions at the far ends of drive 100. A cooling module 111 for engine 104 is mounted on chassis frame 52 frontally of engine 104, and a cooling module 113 for engine 102 is mounted on chassis frame 52 rearward of engine 102.

The top half of each of four engine mounts 108 is fastened to the block of each engine at the four locations shown, and the bottom half of each engine mount is permanently secured to one of the frame side rails using Huck fasteners. The four-point mounting of each engine to the chassis frame contributes to rigidity of the chassis frame.

When one engine, such as front engine 104 for example, can provide sufficient power and torque for propelling a truck (approximately 80% of a typical long haul drive cycle), only front engine 104, and not rear engine 102, operates, with clutch 105 being engaged to couple the generator rotor shaft to the flywheel of engine 104. During portions of a drive cycle where demand is greater, a controller like controller 38 automatically starts rear engine 102 and engages clutch 103 to provide the additional power required. Once the drive cycle returns to lesser demand, the controller automatically turns off rear engine 102 and disengages clutch 103.

Controller 38 provides control of either engine 102, 104 when only one engine is used, and of both engines 102, 104 when both are used, to provide output torque corresponding to a torque request from the driver.

The engine output torque operates generator 106, causing generator 106 to deliver electric current to the electric drive axle motors so that they provide torque to the driven wheels corresponding to the torque request. The driven wheels at the ends of the electric drive axles are loads on the electric drive axle motors. The electric drive motors and the driven wheels at the ends of the axles are loads on generator 106.

The controller also coordinates control of generator 106 and of the motors of the electric drive axles with control of engines 102, 104. By controlling the electric axle drive motors to regulate the load on generator 106, engine speed and that of the generator's rotor shaft can be held constant while accelerating the truck, thereby providing acceleration in the same manner as an infinitely variable mechanical transmission.

By making the electric axle drive motors reversible, a truck can be driven either forward or in reverse.

The truck can also provide brake energy recovery by using the driven axle wheels to operate the electric motors of the drive axles as electric generators to charge a battery, a battery bank, or an ultra-capacitor.

Shown in phantom in FIG. 9 are a front hood 115 covering engine 104 and having a grill frontally of cooling module 111. The rear of a day cab is marked at 117 and that of a sleeper cab at 119. A rear hood 121 covers engine 102 and has a grill rearward of cooling module 113 The rear hood will extend to the rear of either type of cab.

Preferably each engine 102, 104 is a standard production engine with approximately 230 hp, more or less, with CCW flywheel rotation. An example of such an engine is a MaxxForce 8 engine weighing approximately 1200 lbs, about half that of a 460 hp MaxxForce 13 engine.

Figure 11:
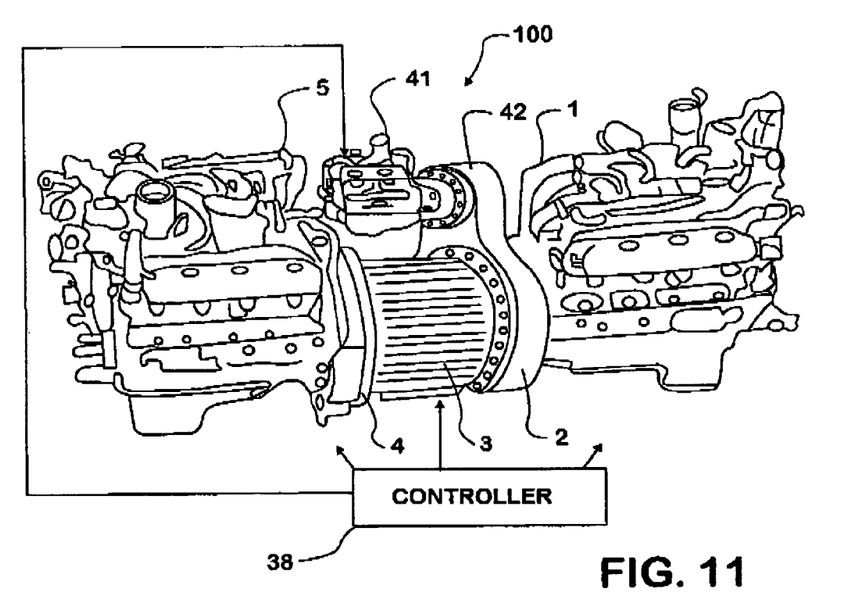
FIG. 11 is perspective view of another embodiment of the invented dual-engine, variable-power drive.

FIG. 11 shows an embodiment which is like that of FIG. 5, but which further includes an auxiliary power unit (APU) 41 and a gear box 42 that contains an auxiliary clutch. APU 41 comprises a diesel engine whose maximum power rating is less than that of either engine 1 or engine 5. An example of APU 41 comprises a 5 hp-13 hp off-road diesel engine (auxiliary engine) which, when running, can operate generator 3 to supply electricity to an electrical system of the vehicle by engaging the auxiliary clutch to couple the auxiliary engine to generator 3. This can provide a "hoteling" capability for a vehicle having a sleeper cab without having to run one of the propulsion engines 1 and 5. APU rotates in the same sense as engine 5 and opposite that of engine 1 so that when the gearbox clutch is engaged, the APU rotates the generator shaft through gear box 42. Engines 1, 5 are disengaged from the generator shaft and need not run during usage of the "hoteling" feature.

The invented drive 100 can be used as the power unit of a propulsion system in numerous mobile vocations which include, on-road (commercial vehicles, for example), off-road (construction shovels, creepers, for example), agricultural (combines, for example), light and heavy rail (passenger and freight locomotives, for example), load trains such as those used to haul freight across remote areas of some countries such as Australia, marine (naval vessels and icebreakers, for example), and military vehicles. It can also stand alone as an electric generator station, such as a back-up electric generator that is used during electric utility power outages.

FIG. 3 is representative of the torque/power capability of each individual engine 1, 5, 102, 104. Each engine has approximately one-half the peak power capability of a single engine having the torque/power capability shown in FIG. 4. Drive 100 can provide ample torque and power most of a typical drive cycle by operating only one engine, using both engines only when extra power is needed. This will accomplish significant fuel economy improvement.

Components 1-5 of the invented drive 100 form a power unit assembly which can be removed from and installed in a vehicle as unit. Such a power unit assembly provides for quick and convenient removal and installation by using quick-release, quick-connect types of fastening devices such as pins, clamps, etc.

Generator 3 and generator 106 are specific examples of devices for converting mechanical energy of rotation into a non-mechanical form of energy. While the generators convert mechanical energy of rotation into electric energy, different devices can convert the energy into forms other than electric. For example, a hydraulic pump can be substituted for the electric generator and hydraulic motors for the electric drive motors that drive the driven axle wheels. Brake energy can be recovered by using the driven wheels to operate the hydraulic motors as pumps for pumping hydraulic fluid into a hydraulic energy storage device.

Instead of hydraulic internal wet-disk clutches for the various clutches, one-way clutches may be used.

What is claimed is:

1. A power unit comprising:
a conversion device for converting mechanical energy of rotation into a different form of energy, the conversion device comprising a rotor shaft which has first and second axial ends opposite each other and which is supported for rotation about an axis;
a first internal combustion engine having a rotary output member which rotates in a given direction;
a second internal combustion engine having a rotary output member which rotates in the same direction as the rotary output member of the first internal combustion engine;
a first clutch through which the rotary output member of the first engine can be selectively coupled to the first axial end of the rotor shaft of the conversion device for transmitting mechanical energy of rotation from the rotary output member of the first engine to the rotor shaft of the conversion device when the first clutch is coupling the rotary output member of the first engine to the rotor shaft of the conversion device; and a second clutch through which the rotary output member of the second engine can be selectively coupled to the second axial end of the rotor shaft of the conversion device for transmitting mechanical energy of rotation from the rotary output member of the second engine to the rotor shaft of the conversion device when the second clutch is coupling the rotary output member of the second engine to the rotor shaft of the conversion device; the rotary member of the first engine, the first clutch, the rotor shaft of the conversion device, the second clutch, and the rotary member of the second engine being arranged in that order lengthwise of the power unit; and a mechanism for inverting the rotation of one of the first and second engines to the rotor shaft of the conversion device.

2. A power unit as set forth in claim 1 in which the conversion device is capable of operating as an electric motor and when operated as an electric motor by electricity from a source of electricity while at least one of the clutches is engaged to couple the rotary output member of the respective engine to the rotor shaft of the conversion device can crank the respective engine.

3. A power unit as set forth in claim 1 in which the conversion device is capable of operating as an electric generator and operates as an electric generator when at least one of the clutches is engaged to couple the rotary output member of at least one of the engines to the rotor shaft and the respective engine is running.

4. A power unit as set forth in claim 3 further including an electrical load which is operated by electric current from the conversion device when operating as an electric generator.

5. A power unit as set forth in claim 4 in which the electrical load which is operated by electric current from the conversion device when operating as an electric generator comprises an electric motor which is operated by electric current from the conversion device when operating as an electric generator.

6. A power unit as set forth in claim 5 mounted in a mobile vehicle which is propelled by operation of the electric motor.

7. A vehicle comprising:

a chassis frame from which at least one drive axle is suspended, the drive axle having driven wheels for supporting the chassis on an underlying surface and propelling the vehicle along the underlying surface;

a conversion device for converting mechanical energy of rotation into a different form of energy, the conversion device comprising a rotor shaft which has first and second axial ends opposite each other and which is supported for rotation about an axis;

a first internal combustion engine having a rotary output member;

a second internal combustion engine having a rotary output member;

a first clutch through which the rotary output member of the first engine can be selectively coupled to the first axial end of the rotor shaft of the conversion device for transmitting mechanical energy of rotation from the rotary output member of the first engine to the rotor shaft of the conversion device when the first clutch is coupling the rotary output member of the first engine to the rotor shaft of the conversion device; and a second clutch through which the rotary output member of the second engine can be selectively coupled to the second axial end of the rotor shaft of the conversion device for transmitting mechanical energy of rotation from the rotary output member of the second engine to the rotor shaft of the conversion device when the second clutch is coupling the rotary output member of the second engine to the rotor shaft of the conversion device; and a powerflow path for conveying power from the conversion device to rotate the driven wheels and thereby propel the vehicle when at least one of the engines is operating and at least one of the clutches is engaged to couple the rotary output member of the respective engine to the rotor shaft of the conversion device; and in which at least the rotor shaft of the conversion device, the rotary member of the first engine, and the first clutch are arranged to rotate about a common axis, and the rotary member of the second engine and the second clutch rotate about respective axes which are parallel with but offset from the common axis about which the rotor shaft of the conversion device, the rotary member of the first engine, and the first clutch rotate.

8. A vehicle as set forth in claim 7 in which the conversion device comprises an electric generator and the powerflow path comprises an electric drive axle which contains the driven wheels and an electric drive motor operated by electric current from the electric generator for rotating the driven wheels.

9. A vehicle as set forth in claim 8 in which the electric drive motor contained in the electric drive axle is capable of generating electricity when disconnected from the electric generator and when disconnected, can be driven by the driven wheels to recover kinetic energy by generating electricity that charges an on-board energy storage device.

10. A vehicle as set forth in claim 7 comprising a controller for coordinating control of the engines, the clutches, and the conversion device to manage powerflow to the driven wheels.

11. A vehicle as set forth in claim 7 in which the first and second clutches are one-way clutches.

12. A vehicle as set forth in claim 7 in which the conversion device, the first engine, the first clutch, the second engine, and the second clutch are assembled together to form a power unit assembly which can be assembled into and removed from the vehicle as a unit.

13. A vehicle as set forth in claim 12 in which the rotary member of the first engine, the first clutch, the rotor shaft of the conversion device, the second clutch, and the rotary member of the second engine are arranged in that order along the length of the chassis frame.

14. A vehicle as set forth in claim 12 in which the rotary member of the first engine, the first clutch, the rotor shaft of the conversion device, the second clutch, and the rotary member of the second engine are arranged in that order along a direction transverse to the length of the chassis frame.

15. A power unit as set forth in claim 1 in which the rotor shaft of the conversion device, the rotary member of the first engine, and the first clutch are arranged to rotate about a common axis, and the mechanism for inverting the rotation of one of the first and second engines to the rotor shaft of the conversion device offsets, from the common axis, an axis about which the rotary member of the second engine rotates and which is parallel with the common axis.

* * * * *